(12) United States Patent
Schmidt et al.

(10) Patent No.: US 8,774,196 B2
(45) Date of Patent: Jul. 8, 2014

(54) ACTIVE ANTENNA ARRAY AND METHOD FOR RELAYING RADIO SIGNALS WITH SYNCHRONOUS DIGITAL DATA INTERFACE

(75) Inventors: Georg Schmidt, Laichingen (DE); Johannes Schlee, Ulm (DE)

(73) Assignee: Kathrein-Werke KG, Rosenheim (DE)

( * ) Notice: Subject to any disclaimer, the term of this patent is extended or adjusted under 35 U.S.C. 154(b) by 525 days.

(21) Appl. No.: 12/792,925

(22) Filed: Jun. 3, 2010

(65) Prior Publication Data
US 2011/0299430 A1    Dec. 8, 2011

(51) Int. Cl.
*H04L 12/28* (2006.01)
*H04L 12/56* (2006.01)
*H01Q 19/10* (2006.01)

(52) U.S. Cl.
USPC ............ 370/395.62; 370/278; 370/310.2; 370/328; 342/74; 342/383; 342/384; 343/757; 343/782; 343/832; 343/840; 375/303; 375/304; 375/307; 375/334

(58) Field of Classification Search
USPC ......... 370/277, 278, 310.2, 328, 334, 395.62, 370/339; 342/74, 359–360, 380–386; 343/745–782, 828–843; 375/295–352
See application file for complete search history.

(56) References Cited

U.S. PATENT DOCUMENTS

| | | | |
|---|---|---|---|
| 5,852,630 A | 12/1998 | Langberg et al. | |
| 6,292,135 B1 * | 9/2001 | Takatori et al. | 342/383 |
| 6,510,191 B2 | 1/2003 | Bockelman | |
| 6,693,588 B1 | 2/2004 | Schlee | |
| 6,823,001 B1 * | 11/2004 | Chea | 375/219 |
| 6,944,188 B2 * | 9/2005 | Sinha et al. | 370/503 |
| 7,194,021 B2 | 3/2007 | Darbel et al. | |
| 7,483,450 B1 * | 1/2009 | Giese et al. | 370/507 |
| 7,580,686 B2 | 8/2009 | Fonden et al. | |
| 2002/0097085 A1 | 7/2002 | Stapleton | |
| 2002/0110211 A1 | 8/2002 | Bockelman | |
| 2003/0164961 A1 | 9/2003 | Daly | |
| 2003/0236107 A1 | 12/2003 | Azuma | |
| 2004/0151506 A1 * | 8/2004 | Shiramizu et al. | 398/140 |

(Continued)

FOREIGN PATENT DOCUMENTS

| | | |
|---|---|---|
| EP | 1120858 | 4/2007 |
| KR | 1020050089853 | 9/2005 |

OTHER PUBLICATIONS

U.S. Appl. No. 12/577,339 entitled: "Radio System and Method for Relaying Radio Signals", filed Oct. 12, 2009.

*Primary Examiner* — Benjamin H Elliott, IV
(74) *Attorney, Agent, or Firm* — Stephen H. Eland; Dann, Dorfman, Herrell & Skillman

(57) ABSTRACT

The present disclosure relates to an active antenna array for a mobile communications network. The active antenna comprises a base band unit coupled to a base station, a plurality of transceiver units and at least one link. The plurality of transceiver units is terminated by at least one antenna element. The at least one link couples individual ones of the plurality of transceiver units to the base band unit 10. The at least one link is a digital link and is adapted to relay an individual transmit signal concurrently and in synchronisation with a transmit clock signal. The present disclosure further teaches a method for relaying radio signals in a mobile communications network. The present disclosure further relates to a computer program enabling a computer to manufacture the active antenna array of the present disclosure and to execute the method of relaying radio signal in a mobile communications system.

24 Claims, 13 Drawing Sheets

(56) References Cited

U.S. PATENT DOCUMENTS

| | | | |
|---|---|---|---|
| 2005/0047495 A1* | 3/2005 | Yoshioka | 375/219 |
| 2005/0110565 A1 | 5/2005 | Robinson | |
| 2005/0111575 A1 | 5/2005 | Taler et al. | |
| 2006/0286940 A1* | 12/2006 | Izumi et al. | 455/78 |
| 2008/0007453 A1* | 1/2008 | Vassilakis et al. | 342/368 |
| 2008/0219331 A1 | 9/2008 | Liang et al. | |
| 2008/0232492 A1 | 9/2008 | Xiao et al. | |
| 2009/0207940 A1 | 8/2009 | Staszewski et al. | |
| 2010/0079341 A1* | 4/2010 | Kenington | 342/368 |
| 2010/0087227 A1 | 4/2010 | Francos et al. | |
| 2010/0093282 A1* | 4/2010 | Martikkala et al. | 455/63.4 |
| 2010/0166109 A1* | 7/2010 | Neumann et al. | 375/296 |
| 2011/0051847 A1 | 3/2011 | Flury et al. | |
| 2011/0159809 A1* | 6/2011 | Kenington | 455/20 |
| 2011/0299430 A1* | 12/2011 | Schmidt et al. | 370/277 |
| 2011/0299456 A1* | 12/2011 | Schmidt et al. | 370/328 |

* cited by examiner

ACTIVE ANTENNA ARRAY AND METHOD FOR RELAYING RADIO SIGNALS WITH SYNCHRONOUS DIGITAL DATA INTERFACE

CROSS REFERENCE TO OTHER APPLICATIONS

The present application is related to U.S. patent application Ser. No. 12/577,339 entitled "A RADIO SYSTEM AND A METHOD FOR RELAYING RADIO SIGNALS", filed Oct. 12, 2009. The present application is also related to U.S. patent application Ser. No. 12/792,936 entitled "ACTIVE ANTENNA ARRAY AND METHOD FOR RELAYING RADIO SIGNALS", filed Jun. 3, 2010. The entire disclosure of each of the foregoing patent applications is incorporated herein by reference.

FIELD OF THE INVENTION

The field of the present invention relates to an active antenna array for a mobile communications network. The field of the present invention further relates to a method for relaying radio signals in a mobile communications network. Furthermore, the field of the present invention relates to a computer program product enabling a foundry to carry out the manufacture of the active antenna array and a computer program product enabling a processor to carry out the method for relaying radio signals in a mobile communications network.

BACKGROUND OF THE INVENTION

The use of mobile communications networks has increased over the last decade. Operators of mobile communications networks have increased the number of base stations in order to meet an increased request for service by users of the mobile communications network. The base stations are typically coupled to an (active) antenna array. The radio signals are typically relayed into a cell of the mobile communications network, and vice versa. It is of interest for the operator of the mobile communications network to reduce the running costs of the base stations. It is one option to implement the radio system as an antenna embedded radio system. With the antenna embedded radio system formed as active antenna array some of the hardware components of the radio system may be implemented on a chip. The active antenna array therefore reduces the costs of the base station. Implementing the radio system as the antenna embedded radio system reduces space needed to house the hardware components of the base station. Power consumption during normal operation of the radio system is substantially reduced when implementing the antenna embedded radio system.

It is of interest to provide a reliable quality of service to an individual user of the mobile communications network given the increase in the number of users. Several techniques have been suggested in order to deal with the increased number of users within the mobile communications network. One of the several techniques comprises beam forming capabilities in order to direct a beam relayed by the active antenna array in different directions to improve service coverage within the cells of the mobile communications network. The beam forming techniques rely on defined phase and amplitude relations between individual ones the antenna elements of the active antenna array. A transmit path and/or a receive path is associated with at least one antenna element. Calibration of the transmit paths and/or the receive paths is required to provide the defined phase, amplitude and delay relationship between the individual ones of the antenna elements. The calibration allows the estimation of a phase, amplitude and delay deviation accumulated along individual transmit paths of the active antenna array. Likewise the calibration comprises estimating phase, amplitude and delay deviations accumulated along individual ones of the receive paths. In a second step the phase, amplitude and delay deviation accumulated along the transmit paths can be corrected. An appropriate phase and amplitude change may be imposed or applied to the individual transmit/receive paths to yield the defined phase and amplitude relationship between the individual transmit/receive paths of the active antenna array, in order to allow for beam forming techniques.

In a modern mobile communications network a payload signal has a defined temporal order when the payload signal is provided to the digital radio interface. Within the active antenna array some data processing may be applied to the payload signal. The data processing typically comprises the packetized payload signal passing through several buffers and clock domains that are synchronized by PLLs With the data processing the defined temporal order of the payload signal may change due to the signal processing. In the prior art it was possible and common practice to calibrate transmit paths along which the payload signal travels when being relayed by the antenna array during manufacture of the antenna array.

A delay of a radio signal caused by the (active) antenna array relaying the radio signal is of interest for position based services. In the prior art it was necessary to recalibrate the active antenna array whenever a component of the active antenna array, for example, a cable, was replaced. The recalibration in the prior art is expensive and time consuming.

U.S. Pat. No. 6,693,588 B1 (assigned to Siemens) discloses an electronically phase-controlled group antenna. The electronically phase-controlled group antenna is calibrated using a reference point shared by all of the reference signals. In the downlink direction, the reference signals, which can be distinguished from one another, are simultaneously transmitted by individual antenna elements of the group antenna and are suitably separated after reception at the shared reference point.

The Siemens system requires a fixed spatial arrangement of the antenna elements.

FIG. 1a shows a passive antenna array 1a as might be known in the prior art. A base station 5 provides a base station signal 7 to the passive antenna array 1a. A digital interface carries the base station signal 7 between the base station 5 and a central base band processing unit 10 of the passive antenna array 1a. The central base band processing unit 10 forwards a transmit signal Tx to a power amplifier 60 in order to amplify the transmit signal Tx. It is to be understood that the transmit signal Tx is typically relayed by antenna elements 85-1, 85-2, . . . , 85-M in a transmit band of the mobile communication system. The signal leaving the central base band unit 10 is a transmit signal in the analogue domain. The transmit signal Tx entering the amplifier 60 is typically in the base band and requires an up-converting into the transmit band prior to the amplifying. The transmit signal Tx may be in the digital domain and further requires an digital-to-analogue conversion. The digital-to-analogue conversion is carried out by a digital-to-analogue converter (not shown) prior to the amplification by the amplifier 60. The analogue transmit signal leaving the amplifier 60 is forwarded to individual transmit paths. Each of the individual transmit paths comprises a duplex filter 25-1, 25-2, . . . , 25-N forwarding the analogue transmit signals to an individual one of the antenna elements 85-1, 85-2, . . . , 85-M. It is to be noted that more than one individual antenna element 85-1, 85-2, . . . , 85-M may be coupled to an individual one of the duplex filters 25-1, 25-2, . . . , 25-N.

Before entering the individual duplex filters 25-1, 25-2, . . . , 25-N the analogue transmit signal travels a passive feeder network 40a. The passive feeder network 40a imposes a fixed phase, amplitude and/or delay relationship between individual ones of the transmit paths terminated by the individual ones of the antenna elements 85-1, 85-2, . . . , 85-M. The passive feeder network 40a provides only little flexibility in terms of beam shaping. Furthermore any change of components within the passive feeder network 40a will require a recalibration of the paths from the amplifier 60 to the individual ones of the duplex filters 25-1, 25-2, . . . , 25-N. It is to be understood that individual ones of the transmit paths run from the amplifier 60 across the passive feeder network 40a and an individual one of the duplex filters 25-1, 25-2, . . . , 25-N and are terminated by an individual one of the antenna elements 85-1, 85-2, . . . , 85-M.

Individual receive paths of the passive antenna array 1a run from the individual antenna elements 85-1, 85-2, . . . , 85-M via the duplex filters 25-1, 25-2, . . . , 25-N and the passive feeder network 40a reaching a receive amplifier 70 and yielding a general receive signal Rx. The general receive signal Rx is formed from individual receive signals received at the antenna elements 85-1, 85-2, . . . , 85-M combined by the passive feeder network 40a. The passive feeder network 40a typically imposes a fixed phase, amplitude and delay relation between the individual receive signals received at individual ones of the antenna elements 85-1, 85-2, . . . , 85-M. Therefore beam forming capabilities for the individual receive signals are limited by the passive feeder network 40a.

The general receive signal Rx is in the analogue domain. The individual receive signals from the antenna element 85-1, 85-2, . . . , 85-M may have undergone a filtering by the duplex filters 25-1, 25-2, . . . , 25-N, as is known in the art. The general receive signal Rx is amplified by the receive amplifier 70 and analogue-to-digital converted using an analogue-to-digital converter (not shown), for example, a sigma-delta analogue-to-digital converter. The signal reaching the central base band processing unit 10 from the receive amplifier 70 is typically in the base band of the passive antenna array 1a. Without any limitation the receive signal from the receive amplifier 70 may be in an intermediate frequency band between a base band of the passive antenna array 1a and a transmit band of the passive antenna array 1a. The signal leaving the receive amplifier 70 requires an analogue-to-digital conversion provided by an analogue-to-digital converter (not shown), for example, a sigma-delta converter but is not limited thereto. The analogue-to-digital converter may be implemented as part of the receive amplifier 70 or the central base band processing unit 10 but is not limited thereto. The central base band processing unit 10 may impose some digital signal processing such as filtering to the digital receive signal and forwards the digital receive signal in the base band to the base station 5.

FIG. 1b shows another aspect of the active antenna array 1a according to the prior art. A system as depicted in FIG. 1b is typically equivalent to combining a prior art remote radio head (RRH) with a known base station antenna within a common housing. The base station signal 7 comprises the receive signal from the central base band processing unit 10 being forwarded to the base station 5. In FIG. 1b the duplex filters 25-1, 25-2, . . . , 25-N of the individual transmit paths of FIG. 1a are replaced by a single duplexer 25. It will be appreciated that the system of FIG. 1b is more cost-efficient than the system depicted in FIG. 1a.

Transmit signals and receive signal between the base station 5 and the central base band processing unit 10 are forwarded along a digital interface. The transmit and/or receive signals may be provided as an in-phase component I and a quadrature component Q. The in-phase component I and the quadrature component Q may be provided according to a standard format set by the open base station architecture interface (OBASI) or in a common protocol radio interface (CPRI) format, but are not limited thereto.

FIG. 2 shows an active antenna array 1a according to the prior art. The active antenna array 1a of FIG. 2 does not comprise the passive feeder network 40a as shown in FIG. 1a. Instead the antenna elements 85-1, 85-2, . . . , 85-M are terminating transceiver units 20-1, 20-2, . . . , 20-N. The transceiver units 20-1, 20-2, . . . , 20-N comprise amplifiers 60-1, 60-2, . . . , 60-N for each one of the transceiver units 20-1, 20-2, . . . , 20-N. Likewise the transceiver units 20-1, 20-2, . . . , 20-N comprise an individual receive amplifier 70-1, 70-2, . . . , 70-N for each one of the transceiver units 20-1, 20-2, . . . , 20-N. The central base band processing unit 10 forwards individual transmit signals Tx-1, Tx-2, . . . , Tx-N from the central base band unit 10 to the individual amplifiers 60-1, 60-2, . . . , 60-N. The individual transmit signals Tx-1, Tx-2, . . . , Tx-N are typically in the analogue domain and in the transmit band of the active antenna array 1a. A digital to analogue conversion is typically carried out by the central base band processing unit 10, as explained before. Receive signal received at the individual antenna elements 85-1, 85-2, . . . , 85-M are amplified at the individual receive amplifiers 70-1, 70-2, . . . , 70-N and forwarded as individual receive signals Rx-1, Rx-2, . . . , Rx-N to the central base band processing unit 10. The individual receive signals Rx-1, Rx-2, . . . , Rx-N are combined by the central base band processing unit 10. The combining of the individual receive signals Rx-1, Rx-2, . . . , Rx-N is carried out in the base band domain. The individual antenna elements 85-1, 85-2, . . . , 85-M receive an analogue receive signal. The central base band processing unit 10 typically performs an analogue-to-digital conversion of the analogue receive signal. Alternatively an analogue to digital converting may be performed by the transceiver units 20-1, 20-2, . . . , 20-N. The central base band processing unit 10 combines the individual receive signals Rx-1, Rx-2, . . . , Rx-N into a global receive signal, the global receive signal is typically forwarded to the base station 5 within the base station signal 7.

The individual transmit signal Tx-1, Tx-2, . . . , Tx-N is in the transmit band of the active antenna array 1a. The individual transmit signals Tx-1, Tx-2, . . . , Tx-N are generated by the central base band processing unit 10. The splitting into the individual transmit signal Tx-1, Tx-2, . . . , Tx-N may be carried out in a digital domain and/or in the analogue domain. The active antenna array 1a as depicted in FIG. 2 is known from phased array antennas used, for example, in RADAR applications or in magnetic resonance imaging.

The active antenna can as well be used for the receive signals. Individual receive signals Rx-1, Rx-2, . . . , Rx-N are amplified by individual receive amplifiers 70-1, 70-2, . . . , 70-N and combined by the central base band processing unit 10 into a general receive signal. The combining into the general receive signal may be carried out in the digital domain and/or in the analogue domain.

In order to operate such phased arrays, i. e. the active antenna array 1a as depicted in FIG. 2, phase, amplitude and delay relations between individual ones of the transceiver units 20-1, 20-2, . . . , 20-N need to be carefully calibrated in order to achieve an intended beam relayed by the active antenna array 1a. If the active antenna array 1a is substantially implemented in the analogue domain, calibration becomes difficult and known solutions are often bulky and expensive.

SUMMARY OF THE INVENTION

The present invention relates to an active antenna array for a mobile communications network. The active antenna array comprises a base band unit, a plurality of transceiver units and at least one link. The base band unit is coupled to a base station. Individual ones of the transceiver units are terminated by at least one antenna element. Hence an individual one of the transceiver units may be terminated by more than one of the antenna elements. The at least one link couples the individual ones of the plurality of transceiver units to the base band unit. The at least one link is a digital link and is adapted to relay an individual transmit signal concurrently and in synchronisation with a transmit clock signal.

The present invention further relates to a method for relaying radio signals in a mobile communications network. The method comprises a generating of a transmit clock signal. The method further comprises a compensating of deviations, and a relaying of an individual transmit signal concurrently and in synchronisation with the transmit clock signal along at least one link.

The present disclosure further relates to a computer program product comprising a non-transitory computer useable medium, having a control logic stored therein for causing a computer to manufacture the active antenna array for a mobile communications network of the present disclosure.

The present disclosure further relates to a non-transitory computer program product comprising a computer useable medium, having a control logic stored therein for causing a computer to relay radio signals in a mobile communications network as disclosed according to the present disclosure.

DETAILED DESCRIPTION OF THE INVENTION

The invention will now be described on the basis of the drawings. It will be understood that the embodiments and aspects described herein are only examples and do not limit the protective scope of the claims in any way. The invention is defined by the claims and their equivalents. It will also be understood that features of one aspect can be combined with features of a different aspect.

Figure 1A:
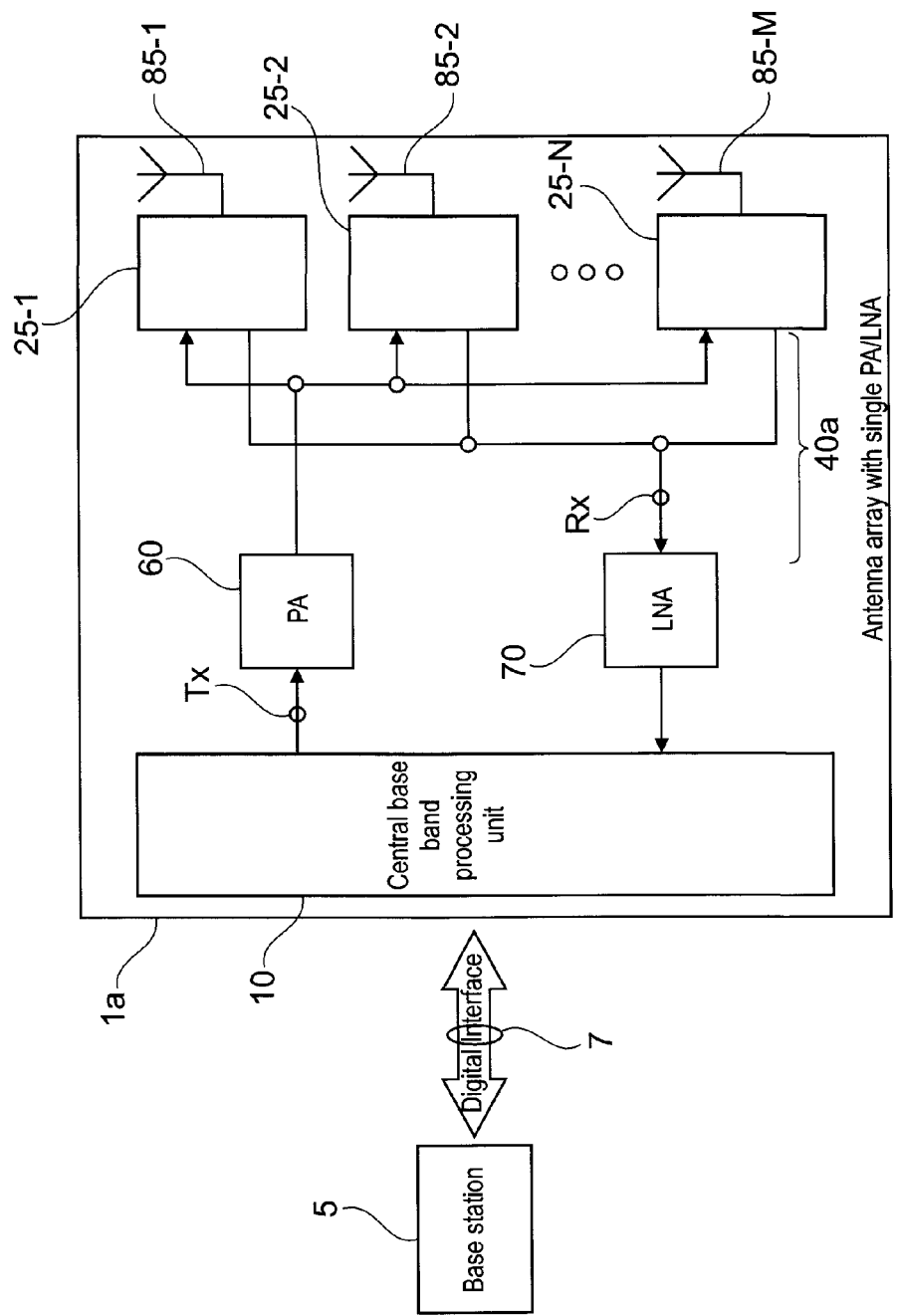
FIG. 1a shows an active antenna array of the prior art.
Figure 1B:
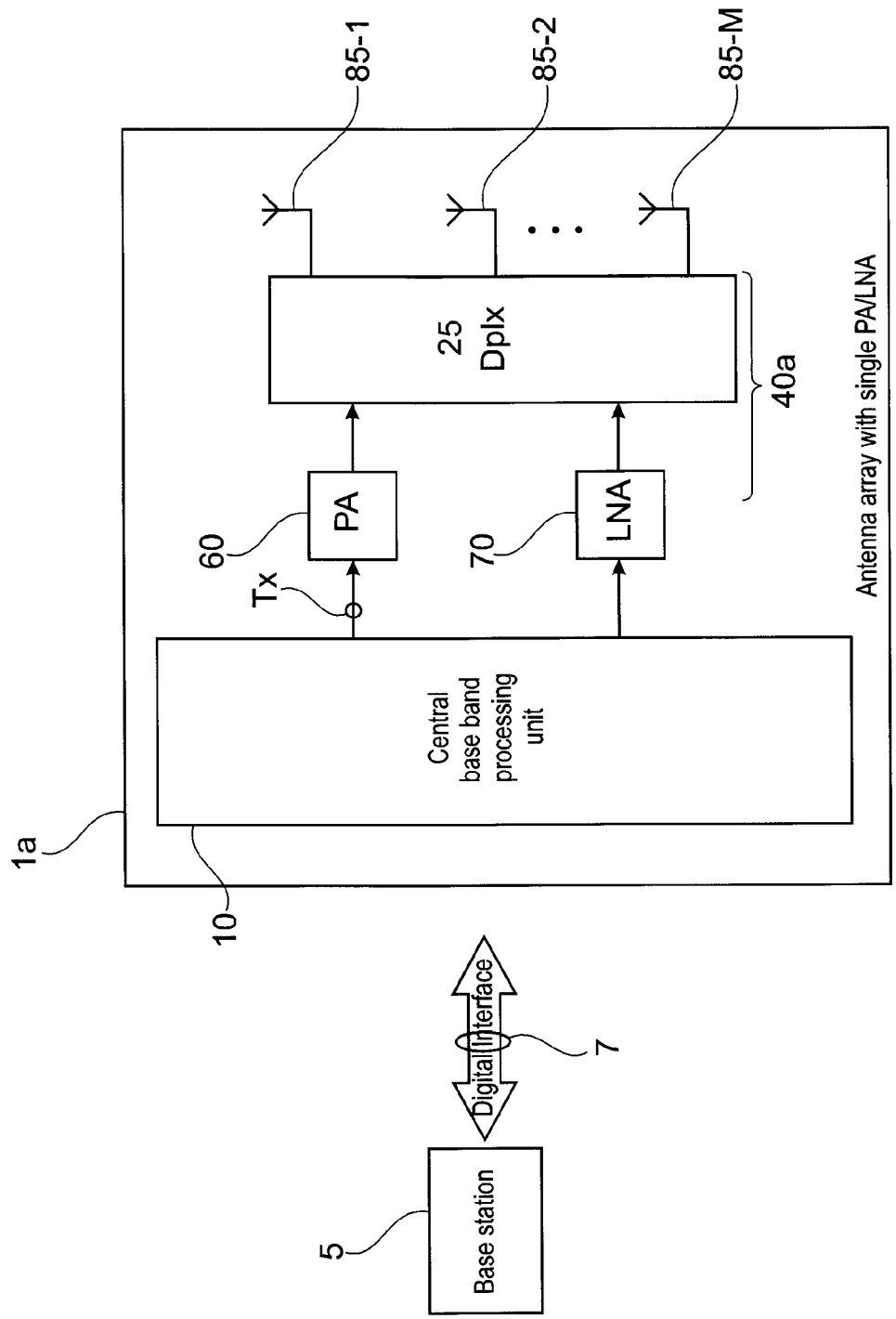
FIG. 1b shows a variant of the active antenna array of the prior art.
Figure 2:
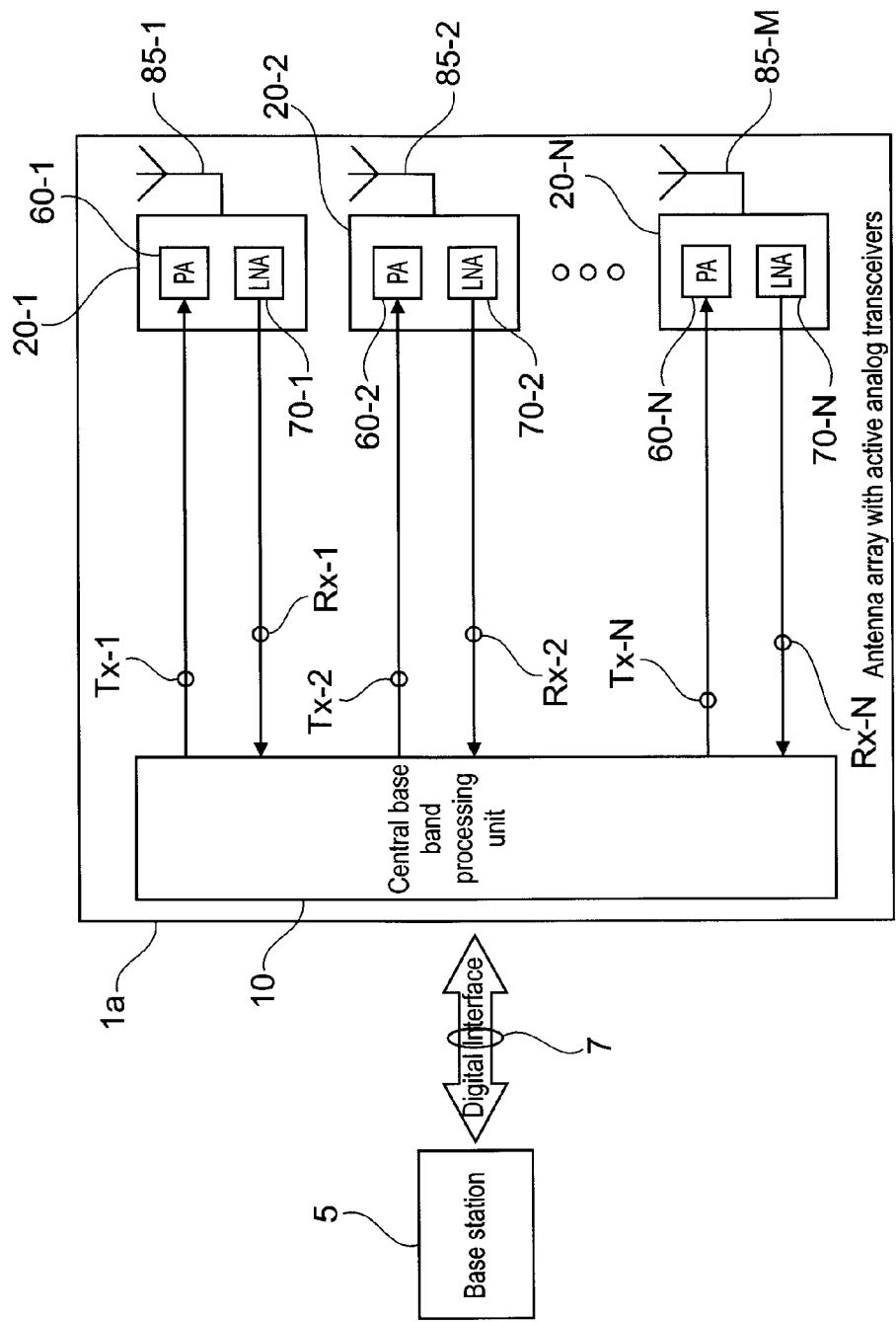
FIG. 2 shows another aspect of an active antenna array according to the prior art.
Figure 3:
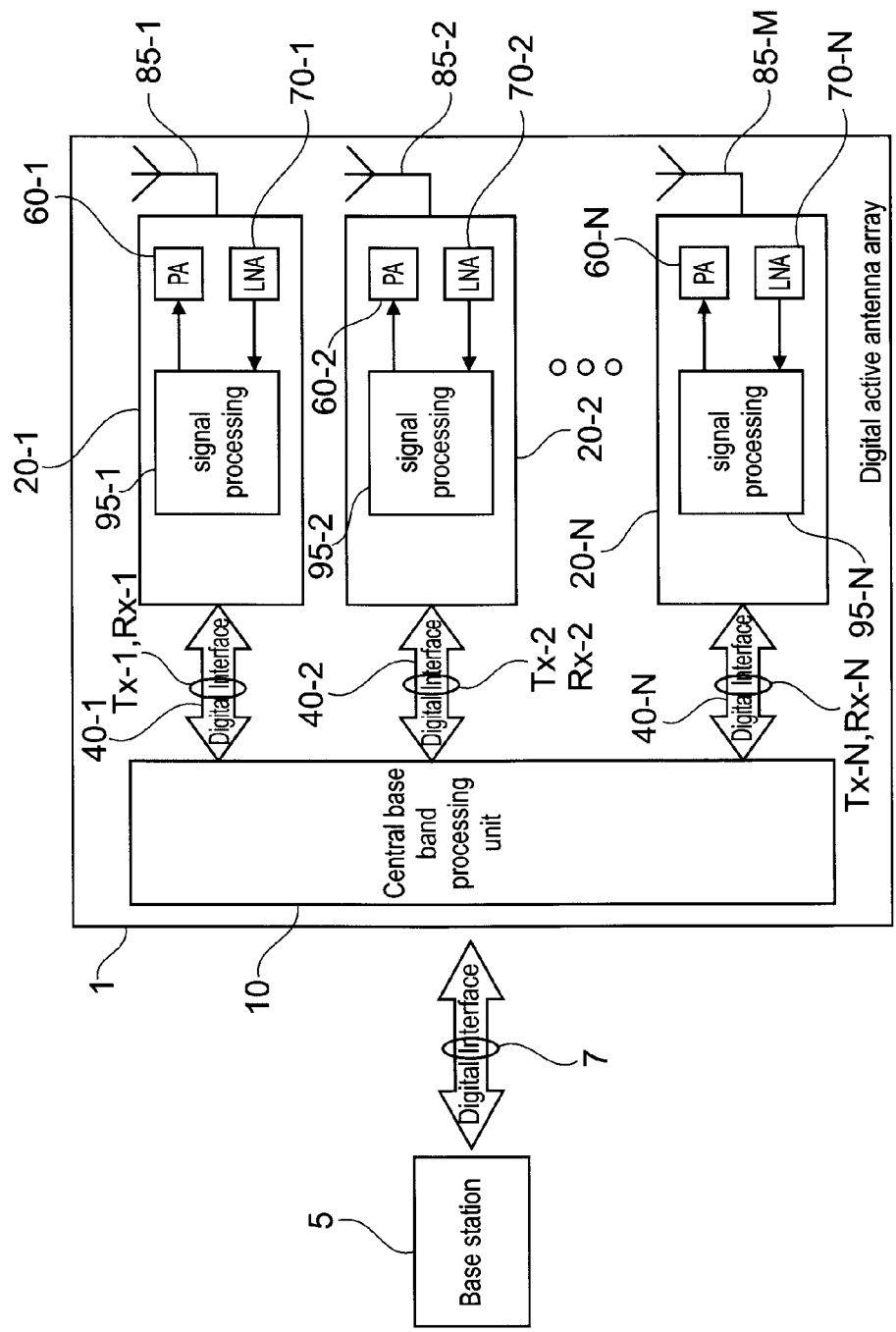
FIG. 3 shows a first aspect of the active antenna array.

FIG. 3 shows an active antenna array 1 according to the present disclosure. The active antenna array 1 is different from the (active) antenna array 1a of the state of the art (see FIGS. 1 and 2) in that a link 40-1, 40-2, ..., 40-N couples the central base band processing unit or a base band unit 10 to individual ones of the transceiver units 20-1, 20-2, ..., 20-N. Hence an individual transmit signal Tx-1, Tx-2, ..., Tx-N forwarded to the transceiver units 20-1, 20-2, ..., 20-N is no longer in the analogue domain (as within FIGS. 1 and 2). Likewise an individual receive signal Rx-1, Rx-2, ..., Rx-N from the transceiver units 20-1, 20-2, ..., 20-N is also in the digital domain when being forwarded to the central base band processing unit 10. The link 40-1, 40-2, ..., 40-N is a digital link.

The link 40-1, 40-2, ..., 40-N between the central base band processing unit 10 and the transceiver units 20-1, 20-2, ..., 20-N is a synchronous digital link. There are several options to implement the link 40-1, 40-2, ..., 40-N. A parallel interface with a parallel clock may be used when forming the link 40-1, 40-2, ..., 40-N. Another example of the link 40-1, 40-2, ..., 40-N is to use a serial interface with an embedded clock. In such a system a serializer/deserializer needs to ascertain that the link 40-1, 40-2, ..., 40-N appears synchronous at its terminals, i.e. to the central base band processing unit 10 and the individual transceiver units 20-1, 20-2, ..., 20-N.

A further example of implementing the link 40-1, 40-2, ..., 40-N is to use a link with a reduced bit width over several transmission lines. The transmission lines may be implemented as low voltage differential signalling (LVDS) lines. A number of transmission lines is reduced and clocking signals (RxClock and/or TxClock) are transmitted in parallel. LVDS transceivers at the terminals of the link 40-1, 40-2, ..., 40-N are required to ascertain that the link appears synchronous it its terminals as for the serial interface described before.

The link 40-1, 40-2, ..., 40-N is further adapted to relay control and/or maintenance information between its terminals.

The term "synchronous" is to be understood to mean that the individual transmit signals Tx-1, Tx-2, ..., Tx-N are relayed along the link 40-1, 40-2, ..., 40-N concurrently and in synchronisation with a transmit clock signal TxClock. The transmit clock signal TxClock may be extracted from the base band signal 7, but is not limited thereto. The transmit clock signal TxClock may also directly be provided within the base station signal 7 or may be generated from rising and/or falling edges of the base station signal 7.

The individual receive signals Rx-1, Rx-2, ..., Rx-N from the individual transceiver units 20-1, 20-2, ..., 20-N are relayed along the links 40-1, 40-2, ..., 40-N concurrently and in synchronisation with a receive clock signal RxClock. The receive clock signal RxClock may be provided by the central base band possessing unit 10 and derived from the base station signal 7.

The receive clock signal RxClock may further be in synchronisation or identical with the transmit clock signal TxClock.

A transmission of the individual transmit signals Tx-1, Tx-2, ..., Tx-N along the links 40-1, 40-2, ..., 40-N at the individual antenna elements 85-1, 85-2, ..., 85-M may be made coherent with the individual transmit signals Tx-1, Tx-2, . . . , Tx-N to be relayed along the links 40-1, 40-2, . . . , 40-N in synchronisation to the transmit clock signal TxClock. The coherent relaying at the individual antenna element relies on phase deviations, amplitude deviations and time delay deviation to be substantially identical for selected ones of the individual transceiver units 20-1, 20-2, . . . , 20-N.

The active antenna array 1 of FIG. 3 comprises processing elements 95-1, 95-2, . . . , 95-N. The processing elements 95-1, 95-2, . . . , 95-N are adapted to perform a signal processing on digital signals and/or forming digital signal(s) from analogue signals. The processing elements 95-1, 95-2, . . . , 95-N can be a digital filtering element, an analogue filtering element, a duplex filter, a digital-to-analogue converter, an analogue-to-digital converter, an equalizer, a mixer but are not limited thereto. Such processing elements are known in the art.

Figure 4:
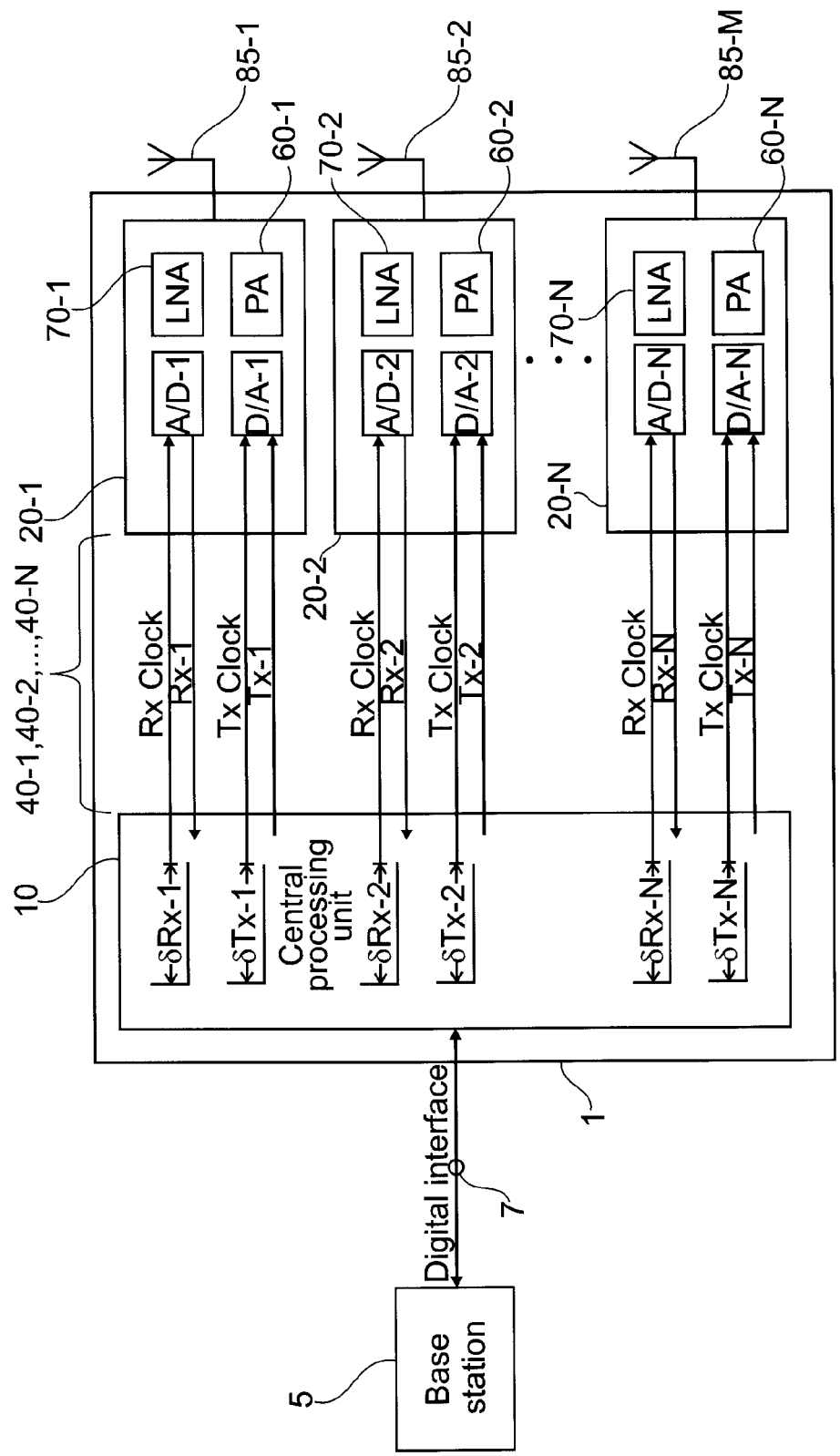
FIG. 4 shows another aspect of the active antenna array.

FIG. 4 illustrates the synchronous relaying of individual transmit signals Tx-1, Tx-2, . . . , Tx-N concurrently and in synchronisation with the transmit clock signal TxClock and the relaying of the individual receive signals Rx-1, Rx-2, . . . , Rx-N across the link 40-1, 40-2, . . . , 40-N in synchronisation to the receive clock signal RxClock in more detail. It is to be understood that the transmit clock signal TxClock and the receive clock signal RxClock are generated by the central processing unit 10. The transmit clock signal TxClock ensures a coherent relaying of the individual transmit signals Tx-1, Tx-2, . . . , Tx-N across the individual link 40-1, 40-2, . . . , 40-N, reaching the receiver units 20-1, 20-2, . . . , 20-N. The transmit clock signal TxClock defines a transmit sampling rate for the individual transmit signals Tx-1, Tx-2, . . . , Tx-N. The transmit clock signal TxClock further defines a sampling time of an individual digital-to-analogue converter DIA-1, D/A-2, . . . , DIA-N converting the individual transmit signal Tx-1, Tx-2, . . . , Tx-N from the digital domain to the analogue domain. The receive clock signal RxClock corresponds to a receive sampling rate of the individual receive signals Rx-1, Rx-2, . . . , Rx-N. The receive clock signal RxClock therefore defines a sampling time of an individual analogue-to-digital converter A/D-1, ND-2, . . . , A/D-N converting the individual receive signals from the analogue domain to the digital domain.

The transmit clock signal TxClock and the receive clock signal RxClock are forwarded to individual ones of the transceiver units 20-1, 20-2, . . . , 20-N along the digital links 40-1, 40-2, . . . , 40-N. The transmit clock signal TxClock and the receive clock signal RxClock are typically synchronous to each other and of substantially identical frequency. A transmit clock generating the transmit clock signal TxClock and a receive clock generating the receive clock signal RxClock may be implemented as independent units or as a general clocking unit generating both signals.

It will be noted that a change in the transmit sampling rate of the analogue-to-digital converter A/D-1, ND-2, . . . , A/D-N will require a change in the transmit clock signal TxClock in order to yield the change in the transmit sampling Tx.

A change in the receive sampling rate RxRate of the individual analogue-to-digital converters A/D-1, ND-2, . . . , ND-N requires a change in the receive clock signal RxClock.

A delay introduced by an individual one of the links 40-1, 40-2, . . . , 40-N depends on a cable length, start-up conditions of buffer elements and/or group delays of analogue filtering elements. The delay introduced by the individual link 40-1, 40-2, . . . , 40-N needs to be known with an accuracy of several nanoseconds in order to yield the coherent relaying of the active antenna array 1 required for beam forming. The delay introduced by the individual link 40-1, 40-2, . . . , 40-N may be measured upon manufacture of the active antenna array with a sufficient accuracy. It is further required that the individual transceiver units 20-1, 20-2, . . . , 20-N substantially provide an identical delay when relaying individual transmit signals Tx-1, Tx-2, . . . , Tx-N and/or individual receive signals Rx-1, Rx-2, . . . , Rx-N. If the delays caused by the individual link 40-1, 40-2, . . . , 40-N and/or the individual transceiver units 20-1, 20-2, . . . , 20-N are known with sufficient accuracy, a transmit delay compensation Tx-1, Tx-2, . . . , Tx-N may be imposed on the individual transmit signals Tx-1, Tx-2, . . . , Tx-N before relaying the individual transmit signals Tx-1, Tx-2, . . . , Tx-N across the link 40-1, 40-2, . . . , 40-N. The transmit delay compensation Tx-1, Tx-2, . . . , Tx-N may be sufficient in order to provide the coherent transmission at the individual antenna elements 85-1, 85-2, . . . , 85-M.

A receive delay compensation Rx-1, Rx-2, . . . , Rx-N may be imposed on the individual receive signals Rx-1, Rx-2, . . . , Rx-N received at the central base band unit 10 in order to provide a temporal alignment, i. e. a coherent receive signal compensating for any receive delay variations caused by the digital links 40-1, 40-2, . . . , 40-N and/or the individual transceiver units 20-1, 20-2, . . . , 20-N.

One may face situations wherein the transmit delays and/or the receive delays are not known with sufficient accuracy in order to ensure the coherent relaying of the active antenna array 1. This may for example be due to delays caused by digital buffer elements and/or analogue filtering elements causing a variation in the delay exceeding the acceptable range of several nanoseconds.

Means are known for measuring the phase deviation, the amplitude deviation and delay deviations between the individual transceiver units 20-1, 20-2, . . . , 20-N as well as techniques for compensating phase, amplitude and delay variations between individual ones of the transceiver units 20-1, 20-2, . . . , 20-N due to imperfections of the transceiver units 20-1, 20-2, . . . , 20-N. It is known that the phase deviation, the amplitude deviation and the time deviation can be measured using a pilot signal and/or by blind methods. The blind methods comprise comparing the payload signal from the base station signal 7 with the radio signal being actually relayed at the antenna elements 85-1, 85-2, . . . , 85-M. In the digital domain correlation methods may be implemented as described in the related U.S. patent application Ser. No. 12/577,339 filed on 1 Apr. 2009.

Figure 5:
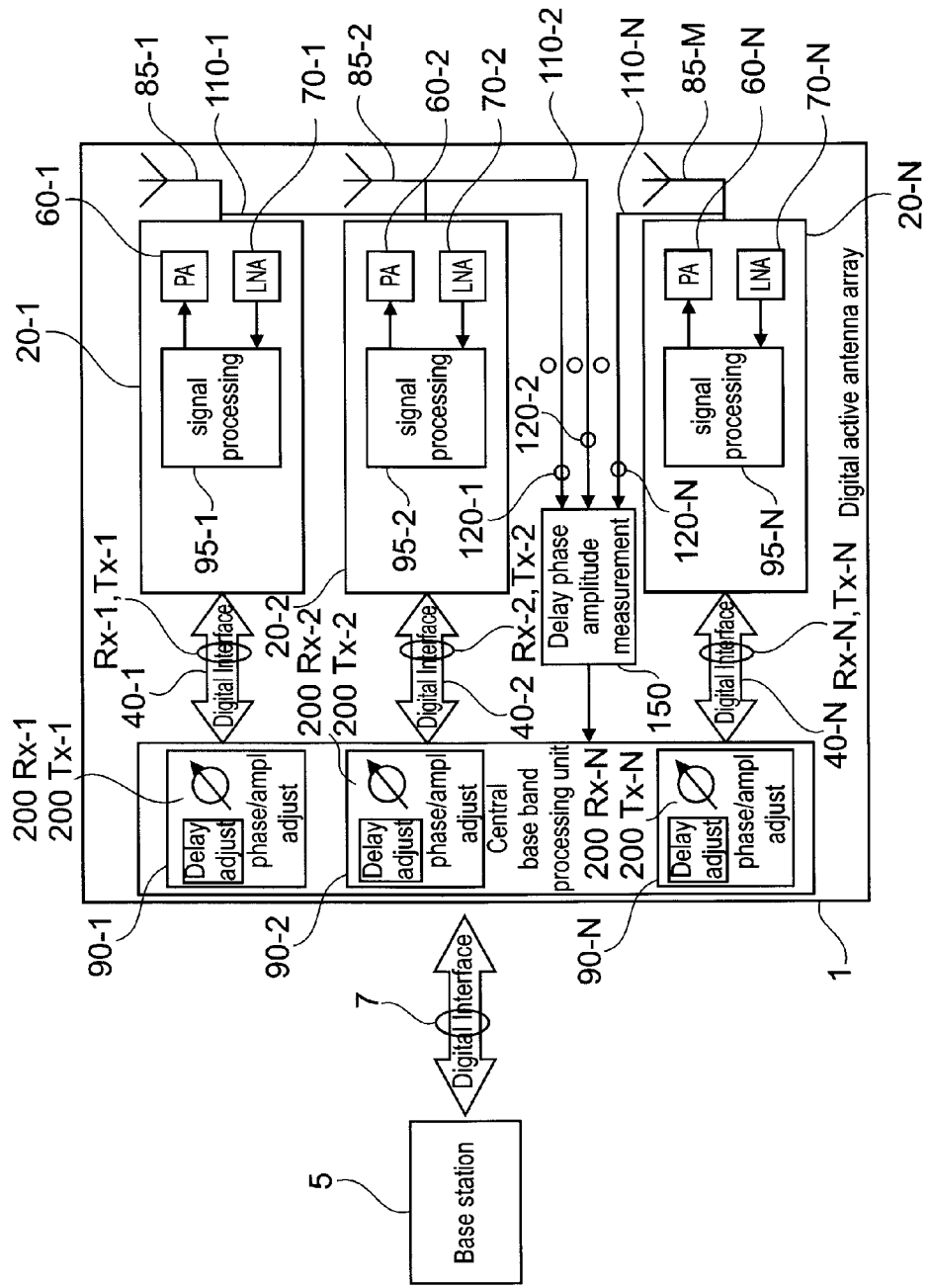
FIG. 5 shows the active antenna array 1 comprising a feedback path.

FIG. 5 shows an aspect of the active antenna array 1 comprising feedback paths 110-1, 110-2, . . . , 110-N from the antenna elements 85-1, 85-2, . . . , 85-M to a measurement unit 150. The feedback paths 110-1, 110-2, . . . , 110-N relay feedback signals 120-1, 120-2, . . . , 120-N. The feedback signal 120-1, 120-2, . . . , 120-N comprises a coupled transmit signal 120Tx-1, 120Tx-2, . . . , 120Tx-N for a calibration of the individual transmit signals Tx-1, Tx-2, . . . , Tx-N of the transceiver units 20-1, 20-2, . . . , 20-N. The coupled transmit signals 120Tx-1, 120Tx-2, . . . , 120Tx-N comprise a small portion of a signal transmitted by the antenna elements 85-1, 85-2, . . . , 85-M. Means for extracting the coupled transmit signals 120Tx-1, 120Tx-2, . . . , 120Tx-N comprise a directional coupler (not shown) but are not limited thereto. The feedback signals 120-1, 120-2, . . . , 120-N further comprises a coupled receive signal 120Rx -1, 120Rx-2, . . . , 120Rx-N corresponding to a small portion of a receive signal received at the individual antenna elements 85-1, 85-2, . . . , 85-M. A comparison between the payload signal within the base station signal 7 entering the central base band processing unit 10 and the coupled transmit signal 120Tx-1, 120Tx-2, . . . , 120Tx-N allows the calculation of transmit deviations Tx-1, Tx-2, . . . , Tx-N. The transmit deviations Tx-1, Tx-2, . . . , Tx-N comprise a transmit phase deviation, an transmit amplitude deviation, and a transmit delay. The transmit deviations Tx-1, Tx-2, ..., Tx-N describe an amount of temporal misalignment between individual ones of the transceiver units 20-1, 20-2, ..., 20-N when transmitting, hence an amount of incoherence.

A comparison of the coupled receive signals 120Rx-1, 120Rx-2, ..., 120Rx-N and a receive signal within the base station signal 7 leaving the central base band processing unit 10 provides receive deviations Rx-1, Rx-2, ..., Rx-N between the individual ones of the transceiver units 20-1, 20-2, ..., 20-N. The receive deviations Rx-1, Rx-2, ..., Rx-N comprise a receive phase variation, a receive amplitude variation and a receive delay variation.

The receive deviations Rx-1, Rx-2, ..., Rx-N and/or the transmit deviations Tx-1, Tx-2, ..., Tx-N are measured at the measurement unit 150. The transmit deviation Tx-1, Tx-2, ..., Tx-N and/or the receive variations Rx-1, Rx-2, ..., Rx-N are forwarded to the central base band processing unit 10. The adjustment units 90-1, 90-2, ..., 90-N are adapted to impose phase compensations, amplitude compensations and delay compensations in order to yield a coherent relaying of the active antenna array 1. The adjustment units 90-1, 90-2, ..., 90-N are adapted to apply transmit compensations 200Tx-1, 200Tx-2, ..., 200Tx-N to the individual transmit signals Tx-1, Tx-2, ..., Tx-N before entering the links 40-1, 40-2, ..., 40-N. The transmit compensations 200Tx-1, 200Tx-2, ..., 200Tx-N may comprise a transmit phase compensation, a transmit amplitude compensation and a transmit delay compensation Tx-1, Tx-2, ..., Tx-N. Applying the transmit compensations 200Tx-1, 200Tx-2, ..., 200Tx-N will substantially correct the transmit deviations Tx-1, Tx-2, ..., Tx-N. Hence a transmission of the active antenna array 1 will be substantially coherent.

Furthermore the adjustment unit 90-1, 90-2, ..., 90-N is adapted to impose a receive compensation 200Rx-1, 200Rx-2, ..., 200Rx-N onto the receive signals Rx-1, Rx-2, ..., Rx-N from individual ones of the transceiver units 20-1, 20-2, ..., 20-N. The receive compensations 200Rx-1, 200Rx-2, ..., 200Rx-N comprise a receive phase compensation, a receive amplitude compensation and a receive delay compensation Rx-1, Rx-2, ..., Rx-N. The receive compensation 200Rx-1, 200Rx-2, ..., 200Rx-N will substantially compensate the receive deviations Rx-1, Rx-2, ..., Rx-N as measured by the measurement unit 150 in order to yield a coherent reception of the active antenna array 1.

It is one option to measure amplitude deviations as part of the transmit deviations Tx-1, Tx-2, ..., Tx-N and/or the receive deviations Rx-1, Rx-2, ..., Rx-N by inserting power meters (not shown). The power meters may be disposed in the transceiver units 20-1, 20-2, ..., 20-N, the central base band processing unit 10 or along the feedback paths 110-1, 110-2, ..., 110-N. The use of power meters, for example, Varactor diodes has been disclosed in the related patent applications of the applicant U.S. patent application Ser. No. 12/577,339.

It will be appreciated that a measurement of phase deviations within the transmit deviations Tx-1, Tx-2, ..., Tx-N and/or the receive deviations Rx-1, Rx-2, ..., Rx-N is crucial in order to be able to perform a phase calibration for the active antenna array 1. Phase measurements may either be performed on the individual transmit signals Tx-1, Tx-2, ..., Tx-N or by injecting a dedicated pilot signal. The dedicated pilot signal has specific properties that allow a measurement of the phase deviations between the individual ones of the transceiver units 20-1, 20-2, ..., 20-N, for example specific correlation properties for the individual transmit signals Tx-1, Tx-2, ..., Tx-N being relayed by the individual one of the transceiver units 20-1, 20-2, ..., 20-N. Hence the individual transmit signals Tx-1, Tx-2, ..., Tx-N may be recognised by the specific correlation properties in order to identify individual ones of the transceiver units 20-1, 20-2, ..., 20-N. Amplitude deviations and phase deviations may be compensated by multiplying complex valued individual transmit signals Tx-1, Tx-2, ..., Tx-N with an appropriate complex factor. The complex multiplication can be performed in the central base band processing unit 10 as depicted in FIG. 5.

Likewise phase measurements may be performed on the individual receive signals Rx-1, Rx-2, ..., Rx-N by injecting a dedicated pilot signal. The dedicated pilot signal has specific properties that allow a measurement of the phase deviations between the individual ones of the transceiver units 20-1, 20-2, ..., 20-N with regards to the individual receive signals Rx-1, Rx-2, ..., Rx-N. Specific correlation properties for the individual one of the receive signals Rx-1, Rx-2, ..., Rx-N may be recognised by the specific correlation properties and will identify individual ones of the transceiver units 20-1, 20-2, ..., 20-N. Amplitude deviations and phase deviations may be compensated by a multiplying complex valued individual receive signals Rx-1, Rx-2, ..., Rx-N within an appropriate complex factor. The complex multiplication may be performed in the central base band unit 10 as depicted in FIG. 5.

Figure 6:
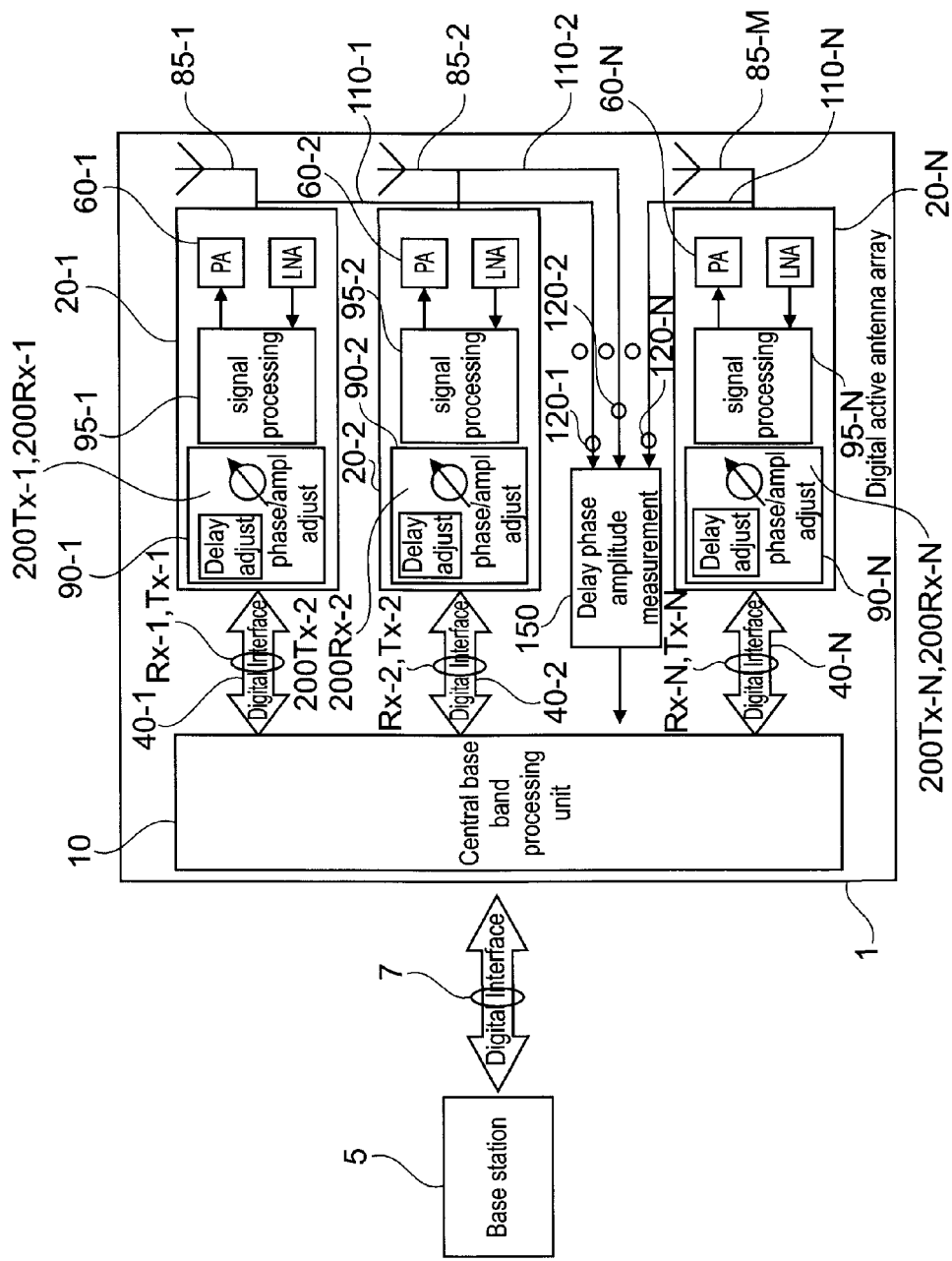
FIG. 6 shows another aspect of the active antenna array comprising the feedback path.

Alternatively the phase compensation and amplitude compensation may be performed independently for each one of the transceiver units 20-1, 20-2, ..., 20-N as is shown in FIG. 6. In FIG. 6 the adjustment units 90-1, 90-2, ..., 90-N were moved from the central base band unit 10 to the transceiver units 20-1, 20-2, ..., 20-N.

A further option for transmit and/or receive amplitude compensation is to vary analogue gains of the transmit amplifiers 60-1, 60-2, ..., 60-N of individual ones of the transceiver units 20-1, 20-2, ..., 20-N for the transmit amplitude compensation. In the receive case an analogue gain of the receive amplifier 70-1, 70-2, ..., 70-N may be varied for individual receive amplifiers 70-1, 70-2, ..., 70-N in order to achieve the amplitude compensation in the receive case.

In order to compensate phase deviations of the transmit deviations Tx-1, Tx-2, ..., Tx-N and/or the receive deviations Rx-1, Rx-2, ..., Rx-N, analogue phase shifting circuits may be used in the analogue transmit amplifiers 60-1, 60-2, ..., 60-N and/or the analogue receive amplifiers 70-1, 70-2, ..., 70-N.

It will be noted that the transmit deviations Tx-1, Tx-2, ..., Tx-N and/or the receive deviations Rx-1, Rx-2, ..., Rx-N may be frequency dependent. Ideally the signal paths on the transceiver units 20-1, 20-2, ..., 20-N would show a substantially "flat" frequency behaviour in their transfer characteristics of signals. Hence a phase and amplitude measurement would not be frequency dependent. In such an ideal case of the "flat" transfer characteristics of the transceiver units 20-1, 20-2, ..., 20-N and a perfect time alignment between individual ones of the transceiver units 20-1, 20-2, ..., 20-N, it would be sufficient to measure phase and amplitude deviations at a single frequency.

Figure 7:
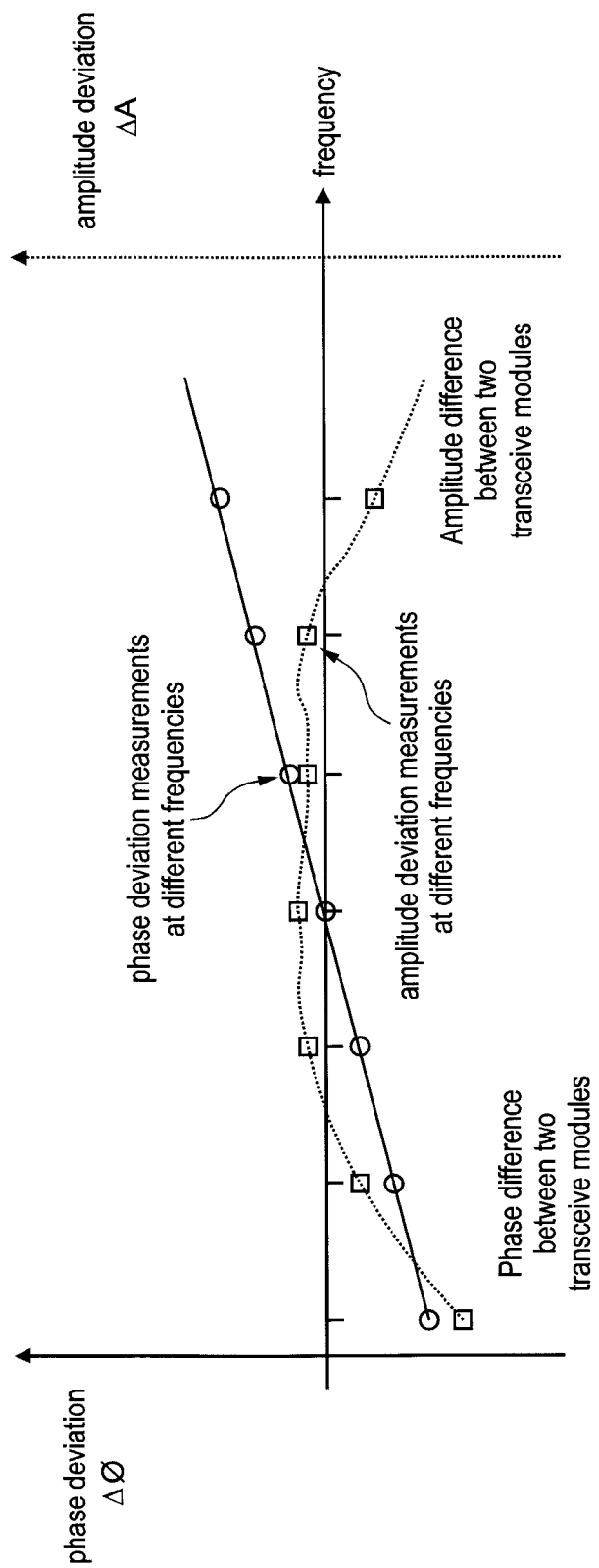
FIG. 7 shows a measurement of amplitude deviations and phase deviations at discrete frequencies.

In a real system this condition of "flat" transfer characteristics is typically not fulfilled with respect to frequency. Signal transfer characteristics in the transmit direction and/or the receive direction may substantially deviate from the "flat" behaviour. It is then of interest to measure the phase deviations and the amplitude deviations at different frequency points as shown in FIG. 7. The open circles indicate phase deviations between individual ones of the transceiver units 20-1, 20-2, ..., 20-N over frequency. The phase deviations within the transmit deviations Tx-1, Tx-2, ..., Tx-N and/or the receive deviations Rx-1, Rx-2, ..., Rx-N are not "flat" as indicated by the solid straight line. The solid straight line actually indicates an interpolation between the frequencies at which the phase deviation was actually measured (open circles, left y-axis).

Likewise the amplitude deviations within the transmit deviations Tx-1, Tx-2, ..., Tx-N and/or the receive deviations Rx-1, Rx-2, ..., Rx-N can be measured at several frequencies as indicated by the open squares (corresponding to the right y-axis) within FIG. 7 between the measured values for the amplitude deviation.

One may face situations in which a bandwidth of the individual transmit signal Tx-1, Tx-2, ..., Tx-N and/or the individual receive signal Rx-1, Rx-2, ..., Rx-N are small. Should the frequency dependence of the amplitude deviations and/or the phase deviations between individual ones of the transceiver units 20-1, 20-2, ..., 20-N be rather broad compared to the bandwidth of the individual transmit signal Tx-1, Tx-2, ..., Tx-N and/or the individual receive signal Rx-1, Rx-2, ..., Rx-N, it may be sufficient to perform phase and/or amplitude corrections for the phase and amplitude deviations with respect to a centre frequency of the individual transmit signal Tx-1, Tx-2, ..., Tx-N and/or the individual receive signal Rx-1, Rx-2, ..., Rx-N. More precisely, the amplitude and phase compensations may be derived by a correction term only depending on the centre frequency of the individual transmit signal Tx-1, Tx-2, ..., Tx-N and/or the individual receive signal Rx-1, Rx-2, ..., Rx-N. A correction of the phase and amplitude measurements at different frequencies (as shown in FIG. 7) can be achieved using the correction term and the centre frequency.

If the amplitude and phase transfer characteristic of the transceiver units 20-1, 20-2, ..., 20-N show a significant variation inside a bandwidth of the individual transmit signal Tx-1, Tx-2, ..., Tx-N and/or the individual receive signal Rx-1, Rx-2, ..., Rx-N, an phase and/or amplitude compensation scheme may be applied. In the transmit direction an in-band compensation scheme can be implemented using a pre-emphasis unit 135. The pre-emphasis unit 135 uses the result of the frequency dependent phase and amplitude deviation as discussed with respect to FIG. 7 to distort the individual transmit signals Tx-1, Tx-2, ..., Tx-N prior to a transmission in order to obtain a substantially "flat" amplitude characteristic and a substantially linear phase variation over frequency at the antenna elements 85-1, 85-2, ..., 85-M. The pre-emphasis unit 135 could be implemented in the central base band processing unit 10 or alternatively at the transceiver unit 20-1, 20-2, ..., 20-N for each one of the transceiver units.

Figure 8:
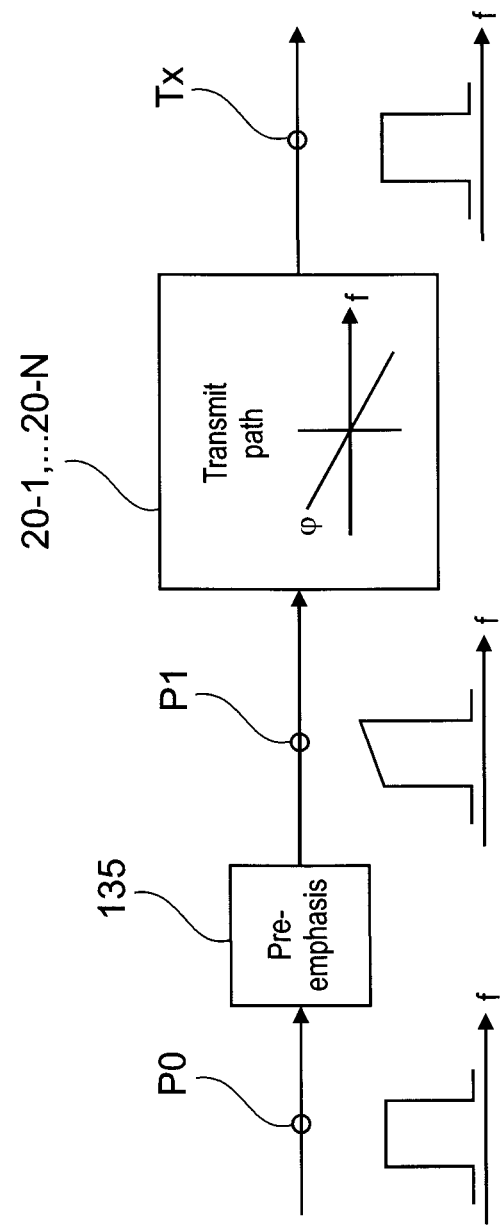
FIG. 8 shows a concept of pre-emphasis for in-band transmit phase compensation.

In FIG. 8 a signal PO having a substantially "flat" variation of the phase over frequency enters the pre-emphasis unit 135 from the left. The pre-emphasis unit 135 adds a linear increase in phase over frequency to the signal PO thereby forming a pre-emphasised signal P1. The pre-emphasised signal P1 enters the transmit path of the transceiver unit 20-1, 20-2, ..., 20-N. The pre-emphasised signal P1 comprises such a variation in phase over frequency that it "inverts" the phase deviations within the transmit deviations Tx-1, Tx-2, ..., Tx-N; thus producing a substantially "flat" individual transmit signal Tx-1, Tx-2, ..., Tx-N with respect to a variation of the phase over frequency.

Figure 9:
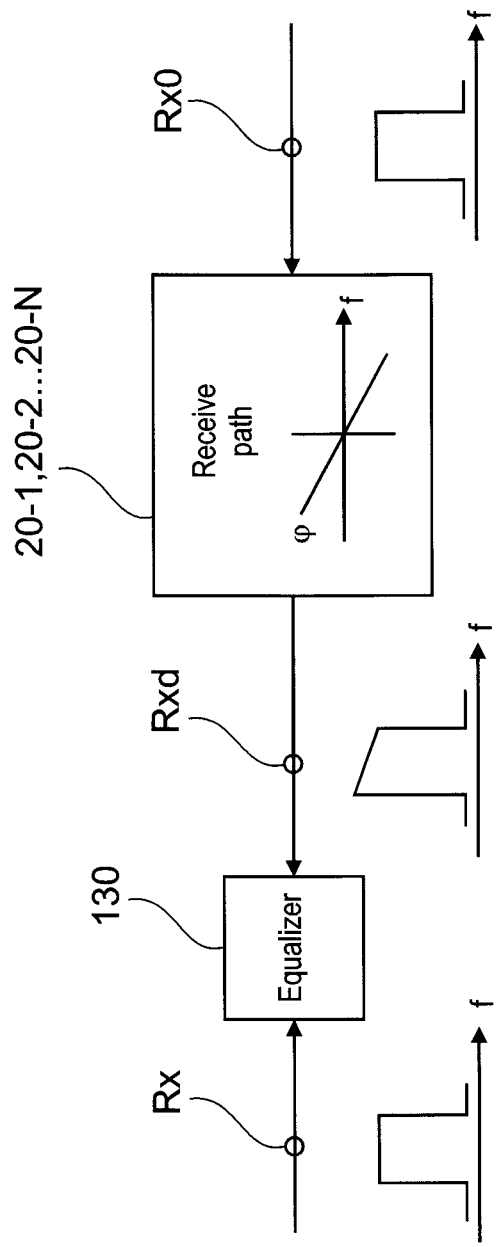
FIG. 9 shows an equalization for in-band receive phase compensation.

In the receive direction an inverse compensation scheme can be implemented based on an equalizer. FIG. 9 shows an in-band receive phase compensation comprising an equaliser 130. A receive signal Rx with a substantially "flat" phase deviation over frequency enters the transceiver units 20-1, 20-2, ..., 20-N from the right. The transceiver units 20-1, 20-2, ..., 20-N impose a frequency dependent phase variation onto the receive signal Rx. A distorted receive signal Rxd comprising a substantially linear variation in phase over frequency, for example, a linear decrease as depicted, will be present at a receive output of the transceiver unit 20-1, 20-2, ..., 20-N. The equalizer 130 may correct for the phase deviations in the receive deviations Rx-1, Rx-2, ..., Rx-N in order to provide an undistorted receive signal comprising the substantially "flat" transfer characteristic of phase over frequency.

The equalizer 130 may be present within the transceiver units 20-1, 20-2, ..., 20-N or the central base band processing unit 10.

The present disclosure further relates to a method 1000 for relaying radio signals in a mobile communications network.

Figure 10:
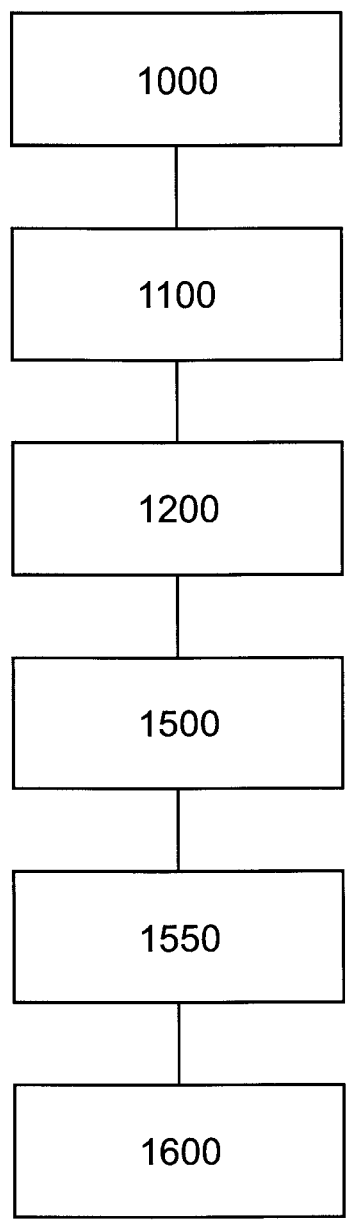
FIG. 10 shows a diagram of a method for relaying radio signal.

FIG. 10 shows a flow diagram of the method 1000. A step 1100 comprises a generating of a transmit clock signal TxClock. The transmit clock signal TxClock will be deduced from the base station signal 7.

In a step 1200 a receive clock signal RxClock is generated. In a step 1500 deviations are compensated.

In a step 1550 an individual transmit signal Tx-1-1, Tx-2, ..., Tx-N is relayed concurrently and in synchronisation with the transmit clock signal TxClock along the at least one link 40-1, 40-2, ..., 40-N.

A step 1600 comprises a relaying of an individual receive signal Rx-1-1, Rx-2, ..., Rx-N concurrently and in synchronisation with the receive clock signal RxClock along the at least one link 40-1, 40-2, ..., 40-N. The individual receive signal Rx-1-1, Rx-2, ..., Rx-N is relayed from the individual transceiver unit 20-1, 20-2, ..., 20-N to the central base band unit 10 across the link 40-1, 40-2, ..., 40-N The individual transmit signal Tx-1, Tx-2, ..., Tx-N is relayed from the central base band processing unit 10 to an individual one of the transceiver units 20-1, 20-2, ..., 20-N.

Figure 11A:
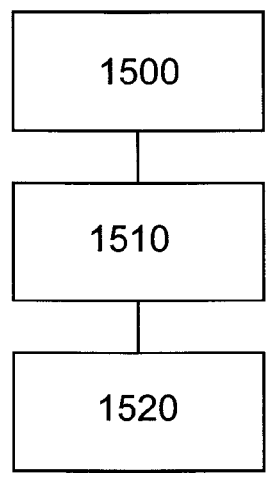
FIG. 11a shows a diagram of a step of compensating deviations.

FIG. 11 a shows details of the step 1500 of compensating. The step 1500 may be carried out an individual one of the transceiver units 20-1, 20-2, ..., 20-N at a time or for more than one of the transceiver units 20-1, 20-2, ..., 20-N concurrently. It is to be understood that the step 1500 is only depicted for one of the transceiver units 20-1, 20-2, ..., 20-N and there may be several iterations of the step 1500 required in order to fully compensate deviations between the individual ones of the transceiver units 20-1, 20-2, ..., 20-N.

A step 1510 comprises a determining and correcting of transmit deviations Tx-1, Tx-2, ..., Tx-N between the individual transmit signal Tx-1-1, Tx-2, ..., Tx-N relayed by individual ones of the transceiver units 20-1, 20-2, ..., 20-N.

A step 1520 comprises a determining and correcting of receive deviations Rx-1, Rx-2, ..., Rx-N between the individual receive signal Rx -1, Rx-2, ..., Rx-N received by individual transceiver units 20-1, 20-2, ..., 20-N.

Figure 11B:
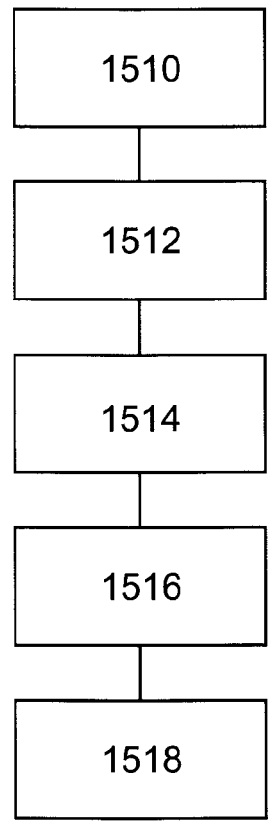
FIG. 11b shows details of the compensating in a transmit case.

FIG. 11b shows details of the step 1510 of determining and correcting of transmit deviations Tx-1, Tx-2, ..., Tx-N. A step 1512 comprises an extracting of at least one coupled transmit signal 120Tx-1-1, 120Tx-2, ..., 120Tx-N. The coupled transmit signals 120Tx-1-1, 120Tx-2, ..., 120Tx-N may be extracted for one individual transceiver unit 20-1, 20-2, ..., 20-N or more than one of the transceiver units 20-1, 20-2, ..., 20-N concurrently (as discussed with respect to FIGS. 5 and 6).

A step 1514 comprises a measuring of transmit deviations Tx-1, Tx-2, ..., Tx-N between individual ones of the coupled transmit signals 120Tx-1-1, 120Tx-2, ..., 120Tx-N. The measuring may be carried out using the measurement unit 150.

The measurement of transmit deviations in the step 1514 may be carried out for all of the transceiver units 20-1, 20-2, ..., 20-N are only selected ones of the transceiver unit 20-1, 20-2, ..., 20-N.

In a step 1516 transmit compensations 200Tx-1-1, 200Tx-2, ..., 200Tx-N are calculated.

In a step 1518 transmit compensations 200Tx-1-1, 200Tx-2, ..., 200Tx-N are imposed on to one or more of the individual transmit signals Tx-1, Tx-2, ..., Tx-N. The transmit compensations comprise at least one of a transmit phase compensations, transmit amplitude compensations and transmit delay compensations Tx-1, Tx-2, ..., Tx-N.

Figure 11C:
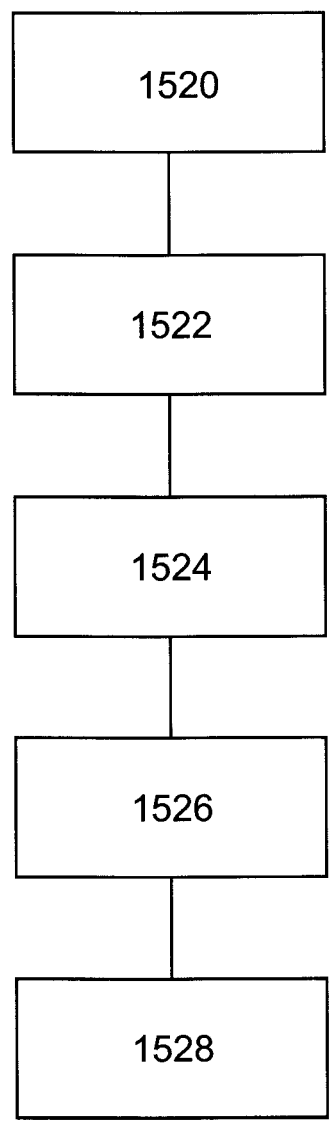
FIG. 11c shows details of the compensating in a receive case.

FIG. 11c shows the determining and correcting 1520 of receive deviations Rx-1, Rx-2, ..., Rx-N in more detail. A step 1522 comprises an extracting of at least one coupled receive signal 120Rx-1, 120Rx-2, ..., 120Rx-N. The coupled receive signal 120Rx-1, 120Rx-2, ..., 120Rx-N may be extracted for one or more than one of the receiver units 20-1, 20-2, ..., 20-N.

A step 1524 comprises a measuring of receive deviations Rx-1, Rx-2, ..., Rx-N between individual ones of the coupled receive signals 120Rx-1-1, 120Rx-2, ..., 120Rx-N. In a step 1526 receive compensations 200Rx-1, 200Rx-2, ..., 200Rx-N are calculated. The calculating 1526 is based on the measuring 1524 of receive deviations Rx-1, Rx-2, ..., Rx-N, possibly comprising the frequency dependent measurement and interpolation as discussed with respect to FIG. 7.

In a step 1528 receive compensations 200Rx-1, 200Rx-2, ..., 200Rx-N are imposed on the individual receive signals Rx-1, Rx-2, ..., Rx-N received at the central base band processing unit 10. The receive compensations 200Rx-1, 200Rx-2, ..., 200Rx-N comprise at least one of a phase receive compensation, an amplitude receive compensation and a delay receive compensation Rx-1, Rx-2, ..., Rx-N, as discussed with respect to FIG. 4.

The present disclosure further teaches a computer program product comprising a non-transitory computer useable medium having a control logic stored therein for causing a computer to manufacture the active antenna array 1 for a mobile communications network of the present disclosure.

The present disclosure further relates to a computer program product comprising a non-transitory computer useable medium having control logics stored therein for causing a computer to relay radio signal in a mobile communications network as discussed with the method 1000 for relaying radio signals in a mobile communications network of the present disclosure.

While various embodiments of the present invention have been described above, it should be understood that they have been presented by way of example, and not limitation. It will be apparent to persons skilled in the relevant arts that various changes in form and detail can be made therein without departing from the scope of the invention. In addition to using hardware (e.g., within or coupled to a central processing unit ("CPU"), micro processor, micro controller, digital signal processor, processor core, system on chip ("SOC") or any other device), implementations may also be embodied in software (e.g. computer readable code, program code, and/or instructions disposed in any form, such as source, object or machine language) disposed for example in a computer useable (e.g. readable) medium configured to store the software. Such software can enable, for example, the function, fabrication, modelling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known computer useable medium such as semiconductor, magnetic disc, or optical disc (e.g., CD-ROM, DVD-ROM, etc.). The software can also be disposed as a computer data signal embodied in a computer useable (e.g. readable) transmission medium (e.g., carrier wave or any other medium including digital, optical, analogue-based medium). Embodiments of the present invention may include methods of providing the apparatus described herein by providing software describing the apparatus and subsequently transmitting the software as a computer data signal over a communication network including the internet and intranets.

It is understood that the apparatus and method describe herein may be included in a semiconductor intellectual property core, such as a micro processor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

Reference Numerals
1a active antenna array
5 base station
7 base station signal
10 central base band processing unit
20-1, 20-2, ..., 20-N transceiver units
25 duplexer
25-1, 25-2, ..., 25-N duplex filters
40-1, 40-2, ..., 40-N link
Tx-1, Tx-2, ..., Tx-N individual transmit signal
Rx-1, Rx-2, ..., Rx-N individual receive signal
TxClock transmit clock signal
RxClock receive clock signal
60-1, 60-2, ... 60-N transmit amplifier
70-1, 70-2, ... 70-N receive amplifier
85-1, 85-2, ... 85-M antenna elements
90-1, 90-2, ... 90-N adjustment units
95-1, 95-2, ... 95-N processing elements
110-1, 110-2, ..., 110-N feedback path to a measurement unit
120-1, 120-2, ..., 120-N feedback signal
120Tx-1, 120Tx-2, ..., 120Tx-N coupled transmit signal
120Rx-1, 120Rx-2, ..., 120Rx-N coupled receive signal
150 measurement unit
200Tx-1, 200Tx-2, ..., 200Tx-N transmit compensations
Tx-1, Tx-2, ..., Tx-N transmit delay compensations
200Rx-1, 200Rx-2, ..., 200Rx-N receive compensations
Rx-1, Rx-2, ..., Rx-N receive delay compensations
Tx-1, Tx-2, ..., Tx-N transmit deviations
Rx-1, Rx-2, ..., Rx-N receive deviations

The invention claimed is:

1. An active antenna array for a mobile communications network, the active antenna array comprising:
   a base band unit coupled to a base station;
   a plurality of transceiver units, wherein individual ones of the plurality of transceiver units are terminated by at least one antenna element;
   a measurement unit, connected with one of the plurality of transceiver units via a feedback path, wherein the measurement unit is operable to measure at least one of a transmit phase deviation, a transmit amplitude deviation, and a transmit delay;
   at least one adjustment unit in either the base band unit or one of the plurality of transceiver units for imposing at least one of a transmit phase compensation, a transmit amplitude compensation and a transmit delay compensation on the individual transmit signals; and at least one link coupling the individual ones of the plurality of transceiver units to the base band unit;

wherein the at least one link is a digital link and is configured to relay an individual transmit signal concurrently and in synchronization with a transmit clock signal, wherein the transmit clock signal defines a sampling time of an individual digital to analogue converter converting the individual transmit signal;

wherein the transmit delay compensation is imposed on the individual transmit signals based on said sampling time before relaying the individual transmit signals across the link.

2. The active antenna array according to claim 1, wherein the at least one link is further configured to relay an individual receive signal concurrently and in synchronisation with the receive clock signal.

3. The active antenna array according to claim 2, wherein the receive clock signal is in synchronisation to the transmit clock signal.

4. The active antenna array according to claim 1, wherein the at least one link is configured to relay control information and maintenance information between the base band unit and individual ones of the transceiver units.

5. The active antenna array according to claim 1, wherein the base band unit is configured to provide at least one of a individual transmit signal, the transmit clock signal and the receive clock signal to an individual one of the transceiver units.

6. The active antenna array according to claim 1, wherein at least one of the transmit clock signal and a receive clock signal are generateable in response to a base station signal received from the base station.

7. The active antenna array according to claim 1, wherein the transmit clock signal corresponds to a transmit sampling rate of the individual transmit signal.

8. The active antenna array according to claim 1, wherein a receive clock signal corresponds to a receive sampling rate of the individual receive signal.

9. The active antenna array according to claim 1, wherein a receive clock signal defines a sampling time of an individual analogue to digital converter converting the individual receive signal.

10. The active antenna array according to claim 1, comprising:
a plurality of transmit amplifiers for amplifying the individual transmit signal transmitted by individual ones of the transceiver units.

11. The active antenna array according to claim 1, comprising:
a plurality of receive amplifiers for amplifying an individual receive signal received by individual ones of the transceiver units.

12. The active antenna array according to claim 1, comprising:
at least one adjustment unit configured to apply at least one of a variable delay, a variable phase weighting and a variable amplitude weighting to a signal passing an individual one of the links.

13. The active antenna array according to claim 1, comprising:
at least one processing element for signal processing within an individual one of the transceiver units, the at least one processing element being selected from the group consisting of: a digital filtering element, an analogue filtering element, a duplex filter, an equalizer and a mixer.

14. The active antenna array according to claim 1, comprising:
at least one feedback path from an individual one of the antenna elements to a measurement unit; the feedback path relaying a feedback signal, the feedback signal comprising at least one of one or more coupled transmit signals being coupled from signals transmit by the individual one of the antenna elements or one or more coupled receive signals being coupled from signals received by the individual one of the antenna elements.

15. The active antenna array according to claim 14, the measurement unit being configured to:
measure a transmit deviation accumulated when transmitting using an individual one of the transceiver units;
wherein the transmit deviation comprises at least one of an transmit amplitude deviation, a transmit phase deviation and a transmit delay compensation.

16. The active antenna array according to claim 14, the measurement unit being configured to:
measure a receive deviation accumulated when receiving using an individual one of the transceiver units;
wherein the receive deviation comprises at least one of a receive amplitude deviation, a receive phase deviation and a receive delay deviation.

17. A method for relaying radio signals in a mobile communications network, the method comprising:
generating a transmit clock signal;
compensating deviations;
relaying an individual transmit signal concurrently and in synchronisation with the transmit clock signal along at least one link,
wherein the transmit clock signal defines a sampling time of an individual digital to analogue converter converting the individual transmit signal;
measuring at least one of a transmit phase deviation, a transmit amplitude deviation, and a transmit delay; and
imposing at least one of a transmit phase compensation, a transmit amplitude compensation and a transmit delay compensation on the individual transmit signals,
wherein the transmit delay compensation is imposed on the individual transmit signals based on said sampling time before relaying the individual transmit signals across the link.

18. The method according to claim 17, further comprising:
generating a receive clock signal;
relaying an individual receive signal concurrently and in synchronisation with the receive clock signal along the at least one link.

19. The method according to claim 17, further comprising:
compensating deviations between individual ones of the transceiver units.

20. The method according to claim 19, the compensating comprising:
determining and correcting transmit deviations between the individual transmit signal relayed by individual ones of the transceiver units; and
determining and correcting receive deviations between the individual receive signal received by individual transceiver units.

21. The method according to claim 20, the determining and correcting of transmit deviations comprising:
extracting at least one coupled transmit signal;
measuring transmit deviations between individual ones of the coupled transmit signals;

calculating transmit compensations; and imposing transmit compensations.

22. The method according to claim 20, the determining and correcting of receive deviations comprising:

extracting at least one coupled receive signal;

measuring receive deviations between individual ones of the coupled receive signals;

calculating receive compensations; and imposing receive compensations.

23. A computer program product stored on a non-transitory medium and comprising a non-volatile computer usable medium having control logic stored therein for causing a computer to manufacture an active antenna array for a mobile communications network, the active antenna array comprising:

a base band unit coupled to a base station;

a plurality of transceiver units terminated by at least one antenna element;

a measurement unit for measuring at least one of a transmit phase deviation, a transmit amplitude deviation, and a transmit delay; and at least one adjustment unit for imposing at least one of a transmit phase compensation, a transmit amplitude compensation and a transmit delay compensation on the individual transmit signals;

at least one link coupling the individual ones of the plurality of transceiver units to the base band unit;

wherein the at least one link is a digital link and is configured to relay an individual transmit signal concurrently and in synchronisation with a transmit clock signal, wherein the transmit clock signal defines a sampling time of an individual digital to analogue converter converting the individual transmit signal; and wherein the transmit delay compensation is imposed on the individual transmit signals based on said sampling time before relaying the individual transmit signals across the link.

a plurality of receive amplifiers for amplifying an individual receive signal received by individual ones of the transceiver units.

24. A computer program product stored on a non-transitory medium and comprising a non-volatile computer usable medium having control logic stored therein for causing a computer to relay radio signals in a mobile communications network, the control logic comprising:

first computer readable program code for causing the computer to generate a transmit clock signal;

second computer readable program code for causing the computer to compensate deviations;

third computer readable program code for causing the computer to relay an individual transmit signal concurrently and in synchronisation with the transmit clock signal along at least one link;

fourth computer readable program code for causing the computer to measure at least one of a transmit phase deviation, a transmit amplitude deviation, and a transmit delay; and fifth computer readable program code for causing the computer to impose at least one of a transmit phase compensation, a transmit amplitude compensation and a transmit delay compensation on the individual transmit signals;

wherein a transmit clock signal defines a sampling time of an individual digital to analogue converter converting an individual transmit signal; and wherein the transmit delay compensation is imposed on the individual transmit signals based on said sampling time before relaying the individual transmit signals across the link.

* * * * *

UNITED STATES PATENT AND TRADEMARK OFFICE
CERTIFICATE OF CORRECTION

PATENT NO. : 8,774,196 B2
APPLICATION NO. : 12/792925
DATED : July 8, 2014
INVENTOR(S) : Georg Schmidt et al.

It is certified that error appears in the above-identified patent and that said Letters Patent is hereby corrected as shown below:

In the Specification

Column 7, line 33, "DIA-1, D/A-2, ..., DIA-N"
    should read -- D/A-1, D/A-2, ..., D/A-N --;

Column 7, line 38, "A/D-1, ND-2, ..., A/D-N"
    should read -- A/D-1, A/D-2, ..., A/D-N --;

Column 7, line 53, "A/D-1, ND-2, ..., A/D-N"
    should read -- A/D-1, A/D-2, ..., A/D-N --;

Column 7, line 57, "A/D-1, ND-2, ..., ND-N"
    should read -- A/D-1, A/D-2, ..., A/D-N --;

Column 11, line 50, "a signal PO having"
    should read -- a signal P0 having --;

Column 11, line 53, "the signal PO thereby"
    should read -- the signal P0 thereby --;

Claim 14, line 7, "from signals transmit by"
    should read -- from signals transmitted by --;

Signed and Sealed this
Twenty-first Day of October, 2014

Michelle K. Lee
*Deputy Director of the United States Patent and Trademark Office*

Claim 23, line 29, "a plurality of receive amplifiers for amplifying an individual receive signal received by individual ones of the transceiver units."
    should be deleted.

UNITED STATES PATENT AND TRADEMARK OFFICE
CERTIFICATE OF CORRECTION

PATENT NO. : 8,774,196 B2
APPLICATION NO. : 12/792925
DATED : July 8, 2014
INVENTOR(S) : Georg Schmidt et al.

It is certified that error appears in the above-identified patent and that said Letters Patent is hereby corrected as shown below:

In the Specification

Column 7, line 33, "DIA-1, D/A-2, ..., DIA-N"
    should read -- D/A-1, D/A-2, ..., D/A-N --;

Column 7, line 38, "A/D-1, ND-2, ..., A/D-N"
    should read -- A/D-1, A/D-2, ..., A/D-N --;

Column 7, line 53, "A/D-1, ND-2, ..., A/D-N"
    should read -- A/D-1, A/D-2, ..., A/D-N --;

Column 7, line 57, "A/D-1, ND-2, ..., ND-N"
    should read -- A/D-1, A/D-2, ..., A/D-N --;

Column 11, line 50, "a signal PO having"
    should read -- a signal P0 having --;

Column 11, line 53, "the signal PO thereby"
    should read -- the signal P0 thereby --;

This certificate supersedes the Certificate of Correction issued October 21, 2014.

Signed and Sealed this
Eleventh Day of November, 2014

Michelle K. Lee
*Deputy Director of the United States Patent and Trademark Office*

In the Claims

Column 16, line 10, Claim 14, "from signals transmit by"
should read -- from signals transmitted by --;

Column 18, lines 1-3, Claim 23, "a plurality of receive amplifiers for amplifying an individual receive signal received by individual ones of the transceiver units."
should be deleted.